Oct. 13, 1970 J. F. BUTTERFIELD 3,534,152

PRODUCTION OF SUBJECTIVE COLOR BY ANIMATION TECHNIQUES

Filed March 24, 1967 3 Sheets-Sheet 1

INVENTOR.
JAMES F. BUTTERFIELD

BY Lyon & Lyon
ATTORNEYS

PRODUCTION OF SUBJECTIVE COLOR BY ANIMATION TECHNIQUES

Filed March 24, 1967 3 Sheets-Sheet 2

INVENTOR.
JAMES F. BUTTERFIELD
BY Lyon & Lyon
ATTORNEYS

Oct. 13, 1970 J. F. BUTTERFIELD 3,534,152

PRODUCTION OF SUBJECTIVE COLOR BY ANIMATION TECHNIQUES

Filed March 24, 1967 3 Sheets-Sheet 3

INVENTOR.
JAMES F. BUTTERFIELD
BY Lyon & Lyon
ATTORNEYS 3,534,152

PRODUCTION OF SUBJECTIVE COLOR BY ANIMATION TECHNIQUES

James F. Butterfield, Van Nuys, Calif., assignor to The Battelle Development Corporation, Columbus, Ohio, a corporation of Delaware Filed Mar. 24, 1967, Ser. No. 625,783
Int. Cl. H04n 9/02
U.S. Cl. 178—5.2 20 Claims

ABSTRACT OF THE DISCLOSURE

A scene or image on a conventional cathode ray tube screen, movie screen, or the like, is produced in selected subjective colors through the use of animation techniques. Numerous subjective color codes comprising sequences of dark and light signals are used to produce the subjective primary colors of red, green and blue, and mixtures thereof. These codes may be correlated in charts with standard physical color notations (e.g., Munsell color notations) to enable predetermined subjective colors to be produced simply. Such correlation is performed by comparing the colors resulting from various subjective color codes with known physical color chips under given conditions. Various subjective colors then can be produced by merely selecting the chip having the desired color (such as the color of an object) and employing the correlated subjective color code in the animation of picture fields or frames for television, movie, computer display, or the like. When the animation so recorded or programmed is played back or read out on a screen, the scene or image is seen in the desired subjective colors.

Reference is made to applicant's copending application Ser. No. 307,976, filed Sept. 10. 1963, and entitled "Subjective Color System," now Pat. No. 3,311,699, and to applicant's copending application Ser. No. 625,813, filed concurrently herewith and entitled "Combining Physical Color and Subjective Color," the disclosures of which are incorporated herein by reference.

The present invention relates to the production of selected subjective colors, and more particularly to the production of desired subjective colors in a relatively simple manner through the use of animation techniques.

There has been investigation and observation of the subjective color phenomenon over the years. Benedict Prevost is credited with discovering this phenomenon in the early eighteen hundreds. Subsequently, J. R. Fechner experimented with black and white rotating discs. Approximately half a century later C. E. Benham designed a disc having only black and white patterns thereon, some of which would appear in color when the disc was rotated. The repetition of certain sequences of light and dark areas apparently is interpreted by the eye and brain as color, and the composition of the sequence and rate of repetition determine the characteristics of the color. United States Pat. No. 2,844,990 to Nagler et al. describes production of subjective color by presenting a series of pictures with motion picture or television equipment. This is accomplished by preparing individual film frames wherein the areas to appear in subjective color are formed by a plurality of spaced black and white lines or cross hatching.

In U.S. Pat. No. 3, 311,699, noted above, there are disclosed for producing subjective colors several methods and arrangements of making areas or color components appear light and dark in certain sequences rather than by using spaced lines or cross hatching as disclosed by Nagler et al. According to said application, "live" pickup of a scene or image may be accomplished through the use of filter means in conjunction with a television or motion picture camera.

It is a principal object of the present invention to provide a method and apparatus for producing subjective color through the use of animation techniques.

An additional object of this invention is to provide solid areas of subjective colors in an improved manner rather than using lines or hatchings.

Another object of this invention is to obtain more saturated subjective color than can usually be achieved through "live" pickup.

A further object of this invention is to obtain a wider range of subjective color hues, values and saturations than generally can be achieved with "live" pickup.

Another object of this invention is to enable picture dissection into two or more subjective color areas for flicker reduction.

An additional object of this invention is to enable in one scene a variety of subjective color sequences frequencies which can be used for special effects or flicker reduction.

Another object of this invention is to enable a wider variety of shapes of a subjective color image to be inserted into another image, such as a black and white image, in a controllable and precisely positioned manner.

Another object of this invention is to provide subjective color through the use of readily available conventional equipment.

A still further object of this invention is to enable precision registration of each primary subjective colored image.

An additional object of this invention is to provide a method for correlating standard physical colors with subjective colors, and to provide charts from which such correlation can readily be determined.

These and other objects and features of the present invention will become apparent through a consideration of the following description taken in conjunction with the drawings in which.

Figures 1, 2, 6A, 7A, 7B:
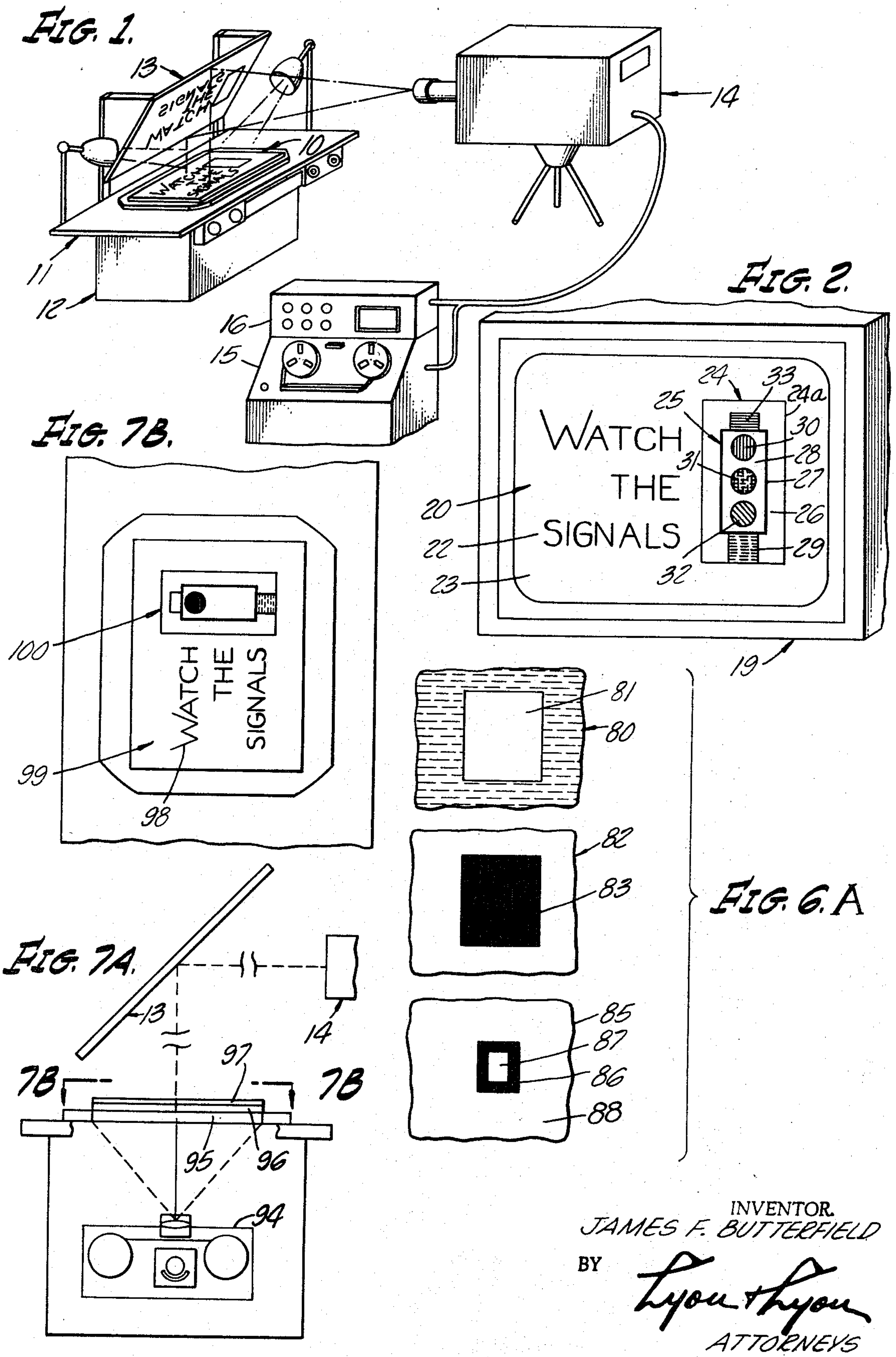
FIG. 1 is a simplified perspective view of a subjective color animation system which may be used in practicing the present invention.
FIG. 2 is a perspective view of a television receiver having a subjective color image produced on the screen thereof.
FIGS. 6A and 6B illustrate a form of animation cells and viewing hood used in correlating physical and subjective colors.
FIG. 7A is a schematic cross-sectional illustration of a special animation stand.
FIG. 7B is a view of the top of the animation stand taken along a line 7B—7B.

Briefly, in accordance with exemplary embodiments of the concepts of the present invention, a repeating sequence of light and dark signals is recorded by a field-by-field or a frame-by-frame animation technique on motion picture film, video tape, or other recording means, or programmed in a computer memory. A camera (television or movie) is mounted at an animation stand and focused on the animation cells and a background. With a motion picture camera, for example, the film is exposed frame by frame, and combinations of animation cells are arranged and recorded to provide the desired frame by frame sequence. With a television camera, video tape is recorded frame-by-frame or field-by-field. Certain areas of the scene are selected to be dark in some frames or fields and light in others. After the cells are recorded, the recording (e.g., film or tape) is played back and the sequences of light and dark on the reproduction screen create subjective color in the selected areas. With a computer, a program is prepared to provide a frame-by-frame pictorial readout on a display such as a cathode ray tube.

Inasmuch as there are numerous combinations of dark and light signals, called herein subjective color codes, for producing various subjective colors, these codes may be related in tables or charts to physical colors in a standard notation, such as the Munsell color notation. Briefly, this is accomplished by preparing various subjective color codes in a given manner, and viewing the resulting respective subjective colors under given conditions and comparing these colors with known physical colors, such as Munsell color chips. The subjective color codes are then assigned to their correlated Munsell color chips and Munsell notations in tables organized in the form of color coding charts. Then, when it is desired to reproduce a particular color, the appropriate subjective color code can be readily selected.

Accordingly, in producing a recording for subsequent viewing, a desired scene or product to be seen is selected. An artist then assigns the colors (either the original colors or different colors) that are to appear in the different areas of the scene. The artist next refers to color coding charts which are made up as described above, and which provide him with sample color chips and the corresponding subjective color codes (sequences of light and dark) necessary to achieve a particular color. Upon determining the proper chip he notes the corresponding subjective color code.

The animation cells are then prepared with the appropriate codes. This is accomplished by the artist making a background and a series of black and white animation cells which have the scene upon them and in which the areas to be in subjective color appear light or dark. The background and cells are placed upon an animation stand, and a field-by-field or frame-by-frame recording of the cells in the appropriate combinations and sequence is made with a camera. The sequence is repeated a number of times to provide the desired duration of the scene and sustain the subjective color. Subsequently, the recording (e.g., video tape or movie film) may be played back at a normal speed and the scene presented on a screen will be perceived in subjective color with the various areas and objects appearing in the colors chosen by the artist which match the original scene or other colors as desired.

Each sequence includes one or more dark or opaque fields or frames (termed the discharge phase) required in the subjective color code and repeated at relatively slow speed which cause the subjective color images or scene to flicker. Accordingly, it is preferable that the subjective color area be limited to an insert in a background image such that only a portion of the entire scene, rather than the entire scene, flickers. This arrangement is particularly useful for television commercials inasmuch as it catches the attention of the viewer and further can be used to advantage in certain instances, such as in the reproduction of a flickering flame in subjective color, or to call attention to a trademark or logo.

In the following description, the picture to be presented will be considered as being composed of a steady black and white image with a subjective color portion or area inserted therein. Either of the two may be composed of any desired kind of pictorial matter. One or the other or both could have "live" action, static shots, animated figures, letters, and so forth. This information in either case may come from a motion picture film, video tape, slide, "live" pickup, and so forth. The insertion of the subjective color area into the black and white image may be accomplished optically or electronically by special effects (optical matting), film processing, a special effects television console, electronic keying, and so forth. In the animation technique noted above, the black and white image can be located on the background or one of the cells. It should be noted that the use of the term "animation" in describing the concepts of the present invention refers to a means or technique for creating subjective color and is not to be construed as a limitation on the pictorial information presented; that is, not limited to animated or cartoon type figures.

It will be understood to those skilled in the art that a film recording is made frame-by-frame. If a television camera is used, the recording may be made frame-by-frame or field-by-field. Under U.S. television standards one frame includes two fields which are interlaced. In discussing subjective color codes subsequently, fields will be referred to since many more coded sequences (and therefore a wider range of colors) are possible under the U.S. television standard of sixty fields per second (thirty frames per second), but it is to be understood that the recording also may be made frame by frame. It is also recognized that two succeeding fields differ slightly from one to the other but they are sufficiently identical for the purposes described herein.

Referring now to the drawings, FIG. 1 illustrates a subjective color animation system for recording a scene in subjective color on video tape with conventional black and white television equipment. Animation cells and a background, both of which will be described in greater detail subsequently, are placed at 10 on an animation stand 11. The animation stand 11 is supported on a base 12 which also supports a mirror 13. A television camera 14 is directed so that the image from the animation cells and background placed at 10 are reflected by the mirror 13 into the camera. A video tape recorder 15 and recording control 16 are connected with the camera 14. The recording control 16 is a device for enabling the recorder 15 to record one television field or frame at a time. An exemplary recording control suitable for this purpose is sold under the tradename Editech by Ampex. The control 16 operates in conjunction with the recorder 15 to record the scene preferably field by field until the entire scene is shot. As noted previously, a scene includes a sequence of fields, the sequence being repeated a desired number of times to provide a recording of the desired length. The video recording thus made may be played back and the signal transmitted over the air or by cable to a black and white television receiver 19 shown in FIG. 2. The scene 20 appears on the screen of the cathode ray tube of the receiver 19.

The scene 20 shown in FIG. 2 is an example of one that might be originally selected by a television producer and shown on the screen of the receiver 19. The scene 20 includes black letters "watch the signals" 22 on a gray background 23. A subjective color insert 24 is confined within a black border **24*a* and includes a traffic signal 25 on a white background 26. The traffic signal 25 has a black frame 27, white housing 28, and a gray pole 29. An upper light 30 appears red, a middle light 31 yellow, and a lower light 32 green. On the top of the frame 27 a timing light 33** is provided which appears blue.

Digressing and considering the scene 20 for a moment as a scene in physical color which has been selected for transmission but not yet recorded and transmitted, the scene is recorded in the following manner. The original scene 20 is turned over to an animation artist who employs color coding charts of the nature illustrated in FIGS. 3A through 3D to determine the proper subjective color coded sequences of light and dark which the various areas of the insert 24 must go through in order for the insert to appear in the desired subjective colors on the screen of the receiver 19. Four exemplary color coding charts are illustrated in FIGS. 3A through 3D and the manner in which these charts are derived will be discussed subsequently. Munsell color chips 35 through 38, respectively red, yellow, green and blue, are affixed to the respective charts shown in FIGS. 3A through 3D, and the Munsell color notations are shown adjacent the respective chips on the charts. A chip and notation indicate by actual physical color and numerical designation the subjective color which will be perceived on the screen of the receiver 19 under normal viewing conditions when the corresponding subjective color code of light and dark is utilized in making a recording of the scene. The subjective color codes may be designated alpha-numerically, such as R·6·2·4. For example, in order to code the presentation of the upper light 30 in FIG. 2 so that this light will appear on the screen of the receiver 19 as a red like Munsell color notation 5.0R5/14 shown in FIG. 3A, the artist refers to the chart in FIG. 3A which indicates the coded sequence of television fields and how animation cells are to be treated. The Munsell number 5.0 gives the hue, the letter R indicates "Red," the 5/ indicates value (brilliancy or intensity), and the /14 indicates the saturation (chroma). The subjective color code 40 shown on the chart in FIG. 3A may be identified as "sequence frequency 5, red code R·6·2·4," meaning the sequence is repeated five times per second on a standard sixty field per second United States television receiver, and that each coded sequence associated with the red area 30 of the insert 24 includes six fields 41, two fields 42 and four fields 43. Thus, the entire insert area 24 is black for the first six television fields (three frames) and provides a discharge phase. For the seventh and eighth television fields (fourth frame), the red area (the upper light 30) is to be black providing a red color coding phase. In these fields the black areas (the border of the insert 24 and the frame 27 of the traffic signal 25) are to be black, the gray area (the pole 29) is to be gray, and the white areas (the backgrounds 26 and 28) are to be white. For the ninth through twelfth television fields (fifth and sixth frame), the red area (the upper light 30) is white; and the black, gray and white areas are the same as in the seventh and eighth television fields thereby providing a white phase. In a similar manner, the middle light 31 may be coded by referring to the chart in FIG. 3B, the lower light 32 by referring to the chart in FIG. 3C, and the top timing light 33 by referring to the chart in FIG. 3D.

Figure 4:
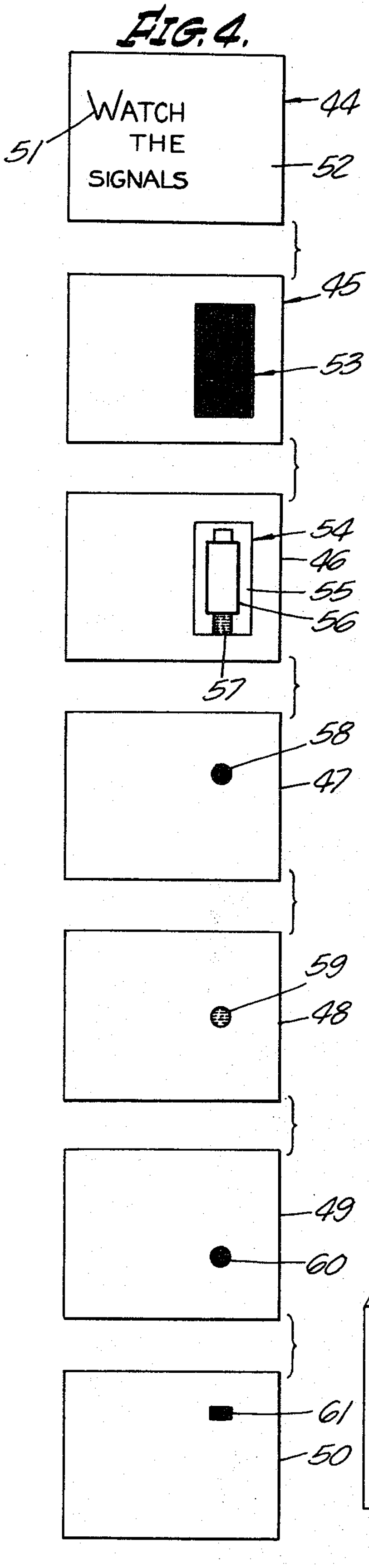
FIG. 4 illustrates art work for producing a subjective color sequence comprising a background and series of animation cells.

After deciding upon the desired colors to be presented in the manner described above and picking a Munsell color chip and notation to match the selected color, the corresponding subjected color code is used to prepare a black and white background cell 44 and animation cells 45 through 50 as shown in FIG. 4. The background cell 44 has the text "watch the signals" 51 against a gray background 52. The animation cells 45 through 50 are standard transparent acetate sheets, and black, gray or white ink, paint or paper are applied to the sheets in the appropriate locations. In the cell 45 the entire subjective color insert area 53 is black. In the cell 46 the entire insert area 54 is in white with a black border 55, black frame 56, and gray post 57. The background 26 (note FIG. 2) in the insert and housing 28 therefore are white as are the four lights 30 through 33. In the cell 47 the upper light 58 (which forms the upper light 30) is black. In the cell 48 the middle light 59 is gray. In the cells 49 and 50 the respective lights 60 and 61 are black.

Figure 5:
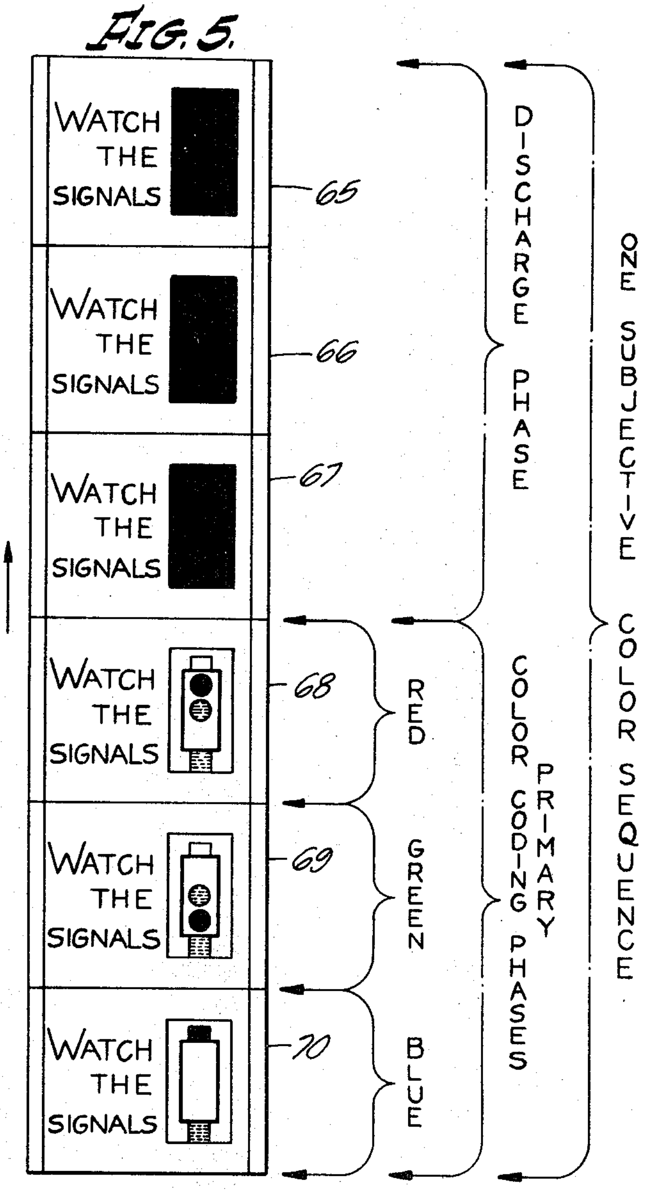
FIG. 5 illustrates the succession of pictures recorded for one subjective color sequence.

FIG. 5 illustrates (by frames to conserve space on the drawing) the resulting sequence of black and white television pictures which will be recorded on video tape by recorder 15 and control 16 if the background 44 and animation cells 45 through 50 are placed on the animation stand 11 shown in FIG. 1 and shot field by field by the camera 14 according to the coding charts shown in FIGS. 3A through 3D. FIG. 5 illustrates one subjective color sequence of six frames (two fields in each frame), this sequence being repeated a number of times to provide the desired length of recording.

The first television frame 65 (which represents two fields) is shot by placing the background 44 and animation cell 45 on the animation stand 11 and recording this twice to provide two fields which equal one frame. The second and third television frames 66 and 67 (two fields each) are shot in the same manner. The fourth television frame 68 is shot by using the background 44 and cells 46, 47 and 48. The fifth televsion frame 69 is shot by using the background 44 and the cells 46, 48 and 49. The sixth television frame 70 is shot by using the background 44 and the cells 46 and 50. As noted above, the same sequence is shot over and over until the scene is complete, i.e., has the desired total viewing time, such as ten second which would require fifty repetitions. It will be noted from FIG. 5, that the various areas to appear in subbjective color go through the proper color coding sequences as indicated by the color coding charts in FIGS. 3A through 3D, and that the four coded sequences thus have been combined into one composite sequence for providing four subjective colors. After recording is completed, it may be played back on a black and white television receiver by means of a video tape machine, and the scene 20 in FIG. 2 appears black and white and the appropriate areas of the insert 24 appear in subjective color on the screen of the receiver.

In a similar manner, a recording on black and white film may be made by employing an animation film camera in place of the television camera 14. The film frames are shot in the same manner as described above for television fields, and when the film is projected in a black and white television film chain the insert 24 likewise will appear in subjective color on the screen of the receiver 19. The frame rate per second usually is different (typically twenty-four) for movies and reduces the number of subjective color code possibilities as will be seen subsequently. However, if a television film chain projector which runs at 30 frames or 60 fields per second is employed so there is a one to one ratio between the film and television then the range of code possibilities is significantly larger. The film also may be projected by an ordinary film projector and the insert seen in subjective color on a motion picture screen. Other monochromatic means of recording and playback of a sequence of images will produce a similar result. A series of frames of pictorial data may be programmed in a computer and read-out on a cathode ray tube display to present images in subjective color, it only being necessary to maintain the frame rate within a range at which subjective color can be perceived. A typical practical range wherein subjective color can be perceived is between three and twenty repetions per second of the subjective color sequence, the optimum being between about five and six.

As the scene is being recorded by the television or film camera, slow pans, travel shots or zoom action may be undertaken. The camera movement can be continuous and does not have to travel in discrete frame steps, i.e., be synchronized, since the usual amount of movement during a subjective color sequence of several television frames (such as six frames or twelve fields as discussed previously) is insignificant.

Various special effects can be achieved by using several subjective color insert areas 24 as shown in FIG. 2 in the scene 20. The subjective color image can be dissected into a number of insert areas with their discharge phases occurring in a random manner with respect to each other thereby achieving considerable reduction in flicker. The artist and the camera technician can quite exactly control the level of black or white and the grey scale in between thereby providing specific colors in high and precise saturations even more so than, for example, through the use of filters as described in said Pat. No. 3,311,699 whereby blacks and whites sometimes become shades of gray.

The insertion of the subjective color image into a black and white picture may be done electronically along with live television pickup such as described in said Pat. No. 3,311,699. One camera records the black and white image and another camera with filter means records the subjective color image and the two are combined electronically in a special effects device. However, there are only a limited number of sizes, shapes and numbers of inserts which are available in these devices. The position of an electronic insertion generally is not precise; whereas, by utilizing animation techniques as described above, the variety of sizes, shapes and number of insertions is practically limitless, and the insertion position is precise. Furthermore, registration of the three primary subjective colors as represented by cells 45 through 50 in FIG. 4 is precise inasmuch as registration of the cells on a conventional animation stand is precise.

The subjective color codes illustrated in FIGS. 3A through 3D are given as examples of the many possible codes that may be formed by varying the length (number of fields or frames) of the discharge phase 41, the red color coding phase 42, the green phase 73, or the blue phase 74. The yellow phase 72 is a mixed color composed of red and green color coding phases. In these exemplary charts, the subjective color sequence frequency (SF) is five sequences per second since there are sixty television fields per second and twelve television fields per sequence( or thirty television frames per second and six television frames per sequence.) The television sequence frequency for red codes typically may vary from, for example, three to twenty sequences per second. Three sequences per second are the minimum number of sequences required for sustained color. Twenty sequences per second are the maximum number of sequences possible for red and blue codes since there must be a minimum of three fields ($3\times20=60$), one for each phase (i.e., discharge, color coding and white phases). There is a maximum of fifteen sequences per second for green codes since there must be a minimum of four fields ($4\times15=60$). At three sequences per second there are twenty television fields (ten frames) per sequence and at twenty there are three television fields per sequence. One or more of the fields is the discharge phase 41; one or more fields is the red color coding phase 42 (red areas black); and one or more fields is the white phase 43 (red areas white). The same holds true for blue codes. Green codes require one or more fields for the discharge phase, one or more fields for the first white phase, one or more fields in the green color coding phase, and one or more fields in the second white phase.

Figure 3A:
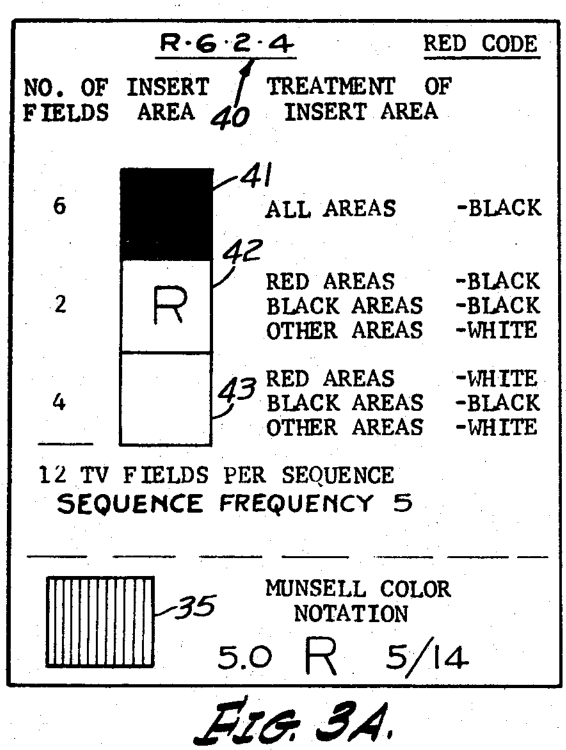
FIGS. 3A through 3D illustrate exemplary color coding charts.
Figure 3B:
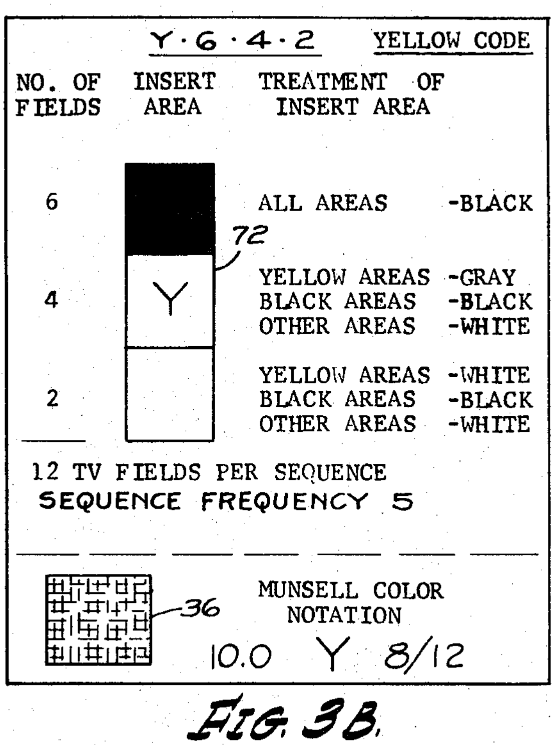
Figure 3C:
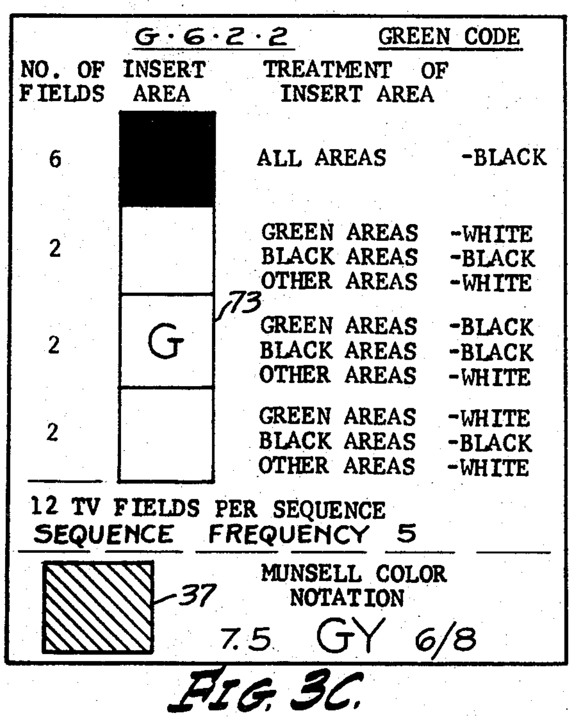
Figure 3D:
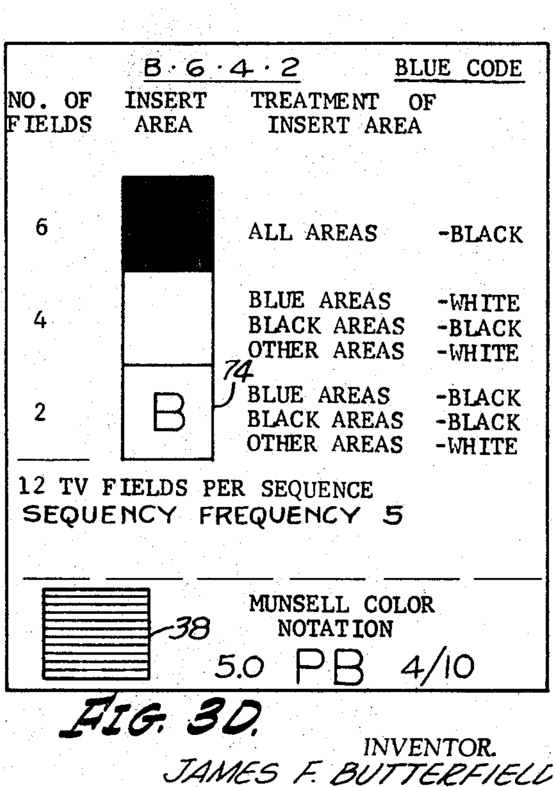

Suitable formulas for determining the various possible subjective color codes for the primary colors of red, green and blue under United States television standards (sixty fields per second) are discussed below. These code designations indicate the number of television fields in each phase of the subjective color sequence. The terms used are defined as follows:

"Subjective Color Sequence" is the succession of light and dark necessary to produce a specific subjective color and is composed of a discharge phase (e.g., fields 41 in FIG. 3A), and primary (red, green or blue) color coding phase (e.g., fields 42 in FIG. 3A), one or two white phases (e.g., fields 43 in FIG. 3A);

"Discharge Phase" is the time period measured in television fields, in which all areas are dark (e.g., fields 41 in FIG. 3A);

"Primary (red, green or blue) Color Coding Phase" is the time period, measured in television fields, in which the specific primary colored area or areas are dark, and some other colored and white areas are light (e.g., fields 42 in FIG. 3A);

"White Phase" is the time period, measured in television fields, in which the specific primary colored area or areas are light and some other colored and white areas are light (e.g., fields 43 in FIG. 3A); and "Sequence Frequency" (SF) is the number of times a "subjective color sequence" is repeated per second (e.g., five in FIGS. 3A to 3D) to sustain the subjective color.

Within the United States television standards of sixty television fields per second there are 7,125 possible subjective color codes (using only black and white and not shades of gray) which vary to to hue (color), value (intensity or brightness), and saturation (chroma). There are 1,140 red subjective color codes using coding of discharge and dark-light; 1,140 blue subjective color codes using coding of discharge and light-dark; and 4,845 green subjective color codes using coding of discharge and light-dark-light. There are a possible 450 red, blue and green subjective codes for using thirty television frames per second. Each of the subjective color codes can be specified by a Munsell color designation. Each code usually gives a different hue, value and saturation of the primary colors (red, green and blue). Combinations of the primary codes produce mixed colors (yellow, violet, brown, etc.) thereby giving a substantial number of possible overall codes, and use of shades of gray substantially increases the possible codes. However, the use of gray usually provides lower saturations.

RED CODES $$[C_r\langle=D_r\cdot B_r\cdot A_r]$$

which is a logical statement defining how the subjective color codes are given (e.g., R.6.2.4 in FIG. 3A).

$$S_r=D_r+B_r+A_r$$
$$SF=K/S_r$$

where:

- $C_r$ is Code Designation for a Subjective Color Sequence which produces red
- $D_r$ is number (integer) of TV fields in Discharge Phase $1\leqslant D_r\leqslant 18$
- $B_r$ is number (integer) of TV fields in the Red Color Coding Phase $1\leqslant B_r\leqslant 18$
- $A_r$ is number (integer) of TV fields in White Phase $1\leqslant A_r\leqslant 18$
- $S_r$ is total number (integer) of TV fields in one Red Code Sequence $3\leqslant S_r\leqslant 20$
- SF is Sequence Frequency $3\leqslant SF\leqslant 20$
- K is 60 (number of TV fields in one second, specified by U.S. standards)

GREEN CODES $$[C_g\langle=D_g\cdot A_{g1}\cdot B_g\cdot A_{g2}]$$

which is a logical statement defining how the subjective color codes are given.

$$S_g=D_g+A_{g1}+B_g+A_{g2}$$
$$SF=K/S_g$$

where:

- $C_g$ is Code Designation for a Subjective Color Sequence which produces green
- $D_g$ is number (integer) of TV fields in Discharge Phase $1\leqslant D_g\leqslant 17$
- $A_{g_1}$ is number (integer) of TV fields in First White Phase $1\leqslant A_{g_1}\leqslant 17$
- $B_g$ is number (integer) of TV fields in the green Color Coding Phase $1\leqslant B_g\leqslant 17$
- $A_{g_2}$ is number (integer) of TV fields in Second White Phase $1\leqslant A_{g_2}\leqslant 17$
- $S_g$ is total number (integer) of TV fields in one Green Code Sequence $4\leqslant S_g\leqslant 20$
- SF is Sequence Frequency $3\leqslant SF\leqslant 15$
- K is 60 (number of TV fields in one second, specified by U.S. standards)

BLUE CODES $$[C_b\langle=D_b\cdot A_b\cdot B_b]$$

which is a logical statement defining how the subjective color codes are given.

$$S_b=D_b+A_b+B_b$$
$$SF=K/S_b$$

where:

$C_b$ is Code Designation for a Subjective Color Sequence which produces blue $D_b$ is number (integer) of TV fields in Discharge Phase $1 \leqslant D_b \leqslant 18$ $A_b$ is number (integer) of TV fields in White Phase $1 \leqslant A_b \leqslant 18$ $B_b$ is number (integer) of TV fields in the blue Color Coding Phase $1 \leqslant B_b \leqslant 18$ $S_b$ is total number (integer) of TV fields in one Blue Code Sequence $3 \leqslant S_b \leqslant 20$ SF is Sequence Frequency $3 \leqslant SF \leqslant 20$ K is 60 (number of TV fields in one second, specified by U.S. standards)

The frame or field rate of the recording and playback equipment determines the maximum possible code variations. It will be apparent that twenty-four motion picture frames per second has fewer possibilities (182) than the thirty frames (450) or sixty (7125) fields per second used in U.S. television equipment. When a twenty-four frame per second film is run through a television film chain there is a further limitation because of the necessity of repeating some of the film frames or half frames to convert to sixty television fields. A computer can be programmed for a large number of frames or fields per second, such as one thousand per second, for providing a read-out on a cathode ray tube and it will be apparent that the possible subjective color codes in this case are enormous.

In order to use the above formulas for other frame or field rates (such as twenty-four motion picture frames per second), the constant K (60) is changed to the desired rate (e.g., 24). The sequence frequency SF is given as a range of 3 to 3 divided into the desired rate (e.g., 24/3=8) in the new pictorial system for red or blue, and for green it is 4 divided into the desired rate (e.g., 24/4=6). $S_r$ and $S_b$ are each given as a range of 3 to 3 divided into the desired rate (e.g., 24/3=8), and $S_g$ given as a range of 4 to 3 divided into the desired rate (e.g., 24/3=8). B, A and D for red and blue are given as a range of 1 to the maximum $S_r$ or $S_b$ minus 2 (8−2=6) for red and blue, and given as a range of 1 to the maximum $S_g$ minus 3 (8−3=5) for green. Thus, for example, the equation for the red codes for twenty-four motion picture frames per second are as follows:

$$[C_r \langle = D_r \cdot B_r \cdot A_r]$$

which is a logical statement defining how the subjective color codes are given, $$S_r = D_r + B_r + A_r$$
$$SF = K/S_r$$

where:

$C_r$ is Code Designation for a Subjective Color Sequence which produces red $D_r$ is number (integer) of movie frames in Discharge Phase $1 \leqslant D_r \leqslant 6$ $B_r$ is number (integer) of movie frames in the Red Color Coding Phase $1 \leqslant B_r \leqslant 6$ $A_r$ is number (integer) of movie frames in White Phase $1 \leqslant A_r \leqslant 6$ $S_r$ is total number (integer) of movie frames in one Red Code Sequence $3 \leqslant S_r \leqslant 8$ SF is Sequence Frequency $3 \leqslant SF \leqslant 8$ K is 24 (number of movie frames in one second, specified by U.S. standards for sound film).

The above also is true for the blue codes. The only differences for the green codes are that $B_g$, $A_g$ and $D_g$ each are in the range of 1 to 5 (rather than 6, for red and blue), $S_g$ is from 4 to 8 and the sequence frequency SF for the green code ranges from 3 to 6. It will be apparent that the above formulas may similarly be used for other frames or field rates.

It has been found that Munsell color chips and notations can be correlated with specific subjective color codes relatively simple. Briefly, this is accomplished by matching Munsell color chips of known values to the subjective colors presented on a screen resulting from selected subjective color codes. Matching is performed under standard conditions by standard observers. When a match is made, the code designation of the subjective color is noted along with the notation of the Munsell color chip. A chart including both the chip, Munsell notation and subjective color code, such as those illustrated in FIGS. 3A through 3D, is prepared, and the resulting charts are organized by physical color characteristics. Then, specific subjective color codes can be selected to produce desired colors as required.

In accomplishing the correlation between Munsell color notations and subjective color codes the following exemplary vrocedure has been found suitable. First, the subjective color code to be correlated by matching is selected. For U.S. television, the code selected falls within the formula requirements given above for red, green and blue codes, or mixtures thereof if desired. As noted previously, the number of possible subjective color codes under commercial television standards is large, and preferably the codes selected for the correlation are those which empirically have been determined to produce saturated primaries and the most common mixed colors, i.e., codes with a sequence frequency between 4 and 10 and having a total number of fields between 15 and 6. Also, these codes should have a discharge phase which has a duration of between 33 and 66 percent of the entire subjective color sequence. To achieve the most saturated colors, the areas to appear colored are made up in black and white rather than in gray and white or shades of gray.

The subjective color test area which will appear on the television screen preferably is a white rectangle (one inch wide by one and one-eighth inches high) with a central colored area which will correspond with the size of a matte Munsell Color Chip (one-half inch wide by five-eighths inch high). However, the subjective color area should be hollow (similar to a square donut) with sides approximately one-eighth inch thick rather than solid as is the Munsell chip because subjective color largely appears as an edge effect phenomenon. There is a white border of approximately one-fourth inch around the subjective color area. This is matched to a Munsell color chip with a one by one and one-eighth inch white surround. The chip will have a one-fourth by three-eighth hole in the center so that its size and configuration are similar to the subjective color test area.

Next, a background cell and two animation cells as shown in FIG. 6A are prepared. These cells, as are the cells used in FIG. 4, are standard cells of transparent acetate sheet about ten inches high by twelve inches wide with holes which fit on pegs of the animation stand. It is preferred that the background cell 80 be fifty percent gray, although this background probably will not be seen in the screen during viewing. The subjective color test area will be four times larger on the cells than its final reproduction on the television screen for reasons which are explained subsequently. A white surround 81 of four inches wide by four and one-half inches high is mounted in the center of the background cell 80. The first animation cell 82 is the discharge cell and has a black area (ink, black paper, etc.) 83 four inches wide by four and one-half inches high in the center. As will be seen, the size of the discharge area 83 is large enough to cover both the color producing area and its surround.

The second transparent animation cell 85 is the color coding cell. The area 86 to appear in subjective color is dark (preferably black) and two inches wide by two and one-half inches high. As noted above, this area preferably is hollow (one inch wide by one and one-half inches high) and transparent at 87 since subjective color largely appears as an edge effect phenomenon. The surround 88 is transparent. In the event mixed colors are desired, several of these cells may be used with various shades of gray color producing areas 86.

After the background cell and animation cells are prepared as described above, the sequence is recorded on video tape or film in accordance with the selected subjective color code sequence. This is accomplished in the same manner as described above in connection with FIGS. 4 and 5 by shooting one or more cells at a time on the background. In the discharge phase, the cell 82 is placed on the background 80. In the color coding phase, the cell 85 is placed on the background 80. In the white phase or phases the cell 80 is shot alone with a transparent dummy cell on top for maintaining density value. These are shot so that the field size of the animation cell fills the camera frame. Enough sequences are shot so that a loop of video tape or film can be formed. If a video tape recording is made, it can then be transmitted to a receiver. If a film recording is made, the film may be placed in a film projector operating at 30 or 60 frames per second (assuming U.S. television standards) and synchronized with the television camera, and recorded on video tape, or the output of the camera may be transmitted to a receiver. A conventional twenty-four frame television film chain may be used and then the resulting matches, although differing from those obtained with the thirty or sixty frames per second, will be applicable to conventional twenty-four frame animation films. All controls and levels should be set for a high contrast picture within FCC standards.

The receiver controls are set for normal television viewing. Viewing should be close-up for optimum matching conditions. Therefore, a television receiver having approximately a five inch screen should be used so that the number of lines in the test area is similar to the number of lines on a nineteen inch screen viewed at a conventional distance. That is, the test area will appear one and one-eighth inches high on a five inch (two and one-half inches high) screen compared to an area of four and one-half inches high on a nineteen inch screen (ten inches high). This provides approximately one hundred and ten television interlaced raster lines below each test area. The one-eighth inch thick wall of the rectangle colored area will be one half inch wide on a nineteen inch screen which is ideal for maximum saturation. Conventional viewing of a nineteen inch screen is about eight feet, and thus viewing of a five inch screen should be about two feet. However, viewing for best matching is at approximately one and one-half feet.

Figure 6B:
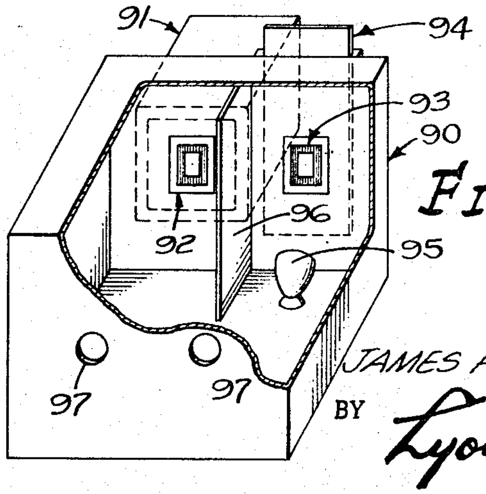

In order to block exterior light, reflections and the like, a viewing hood 90 should be used as shown in FIG. 6B. A preferred viewing hood is about eighteen inches long, fifteen inches in height and width, and painted flat black inside except the rear wall which is painted fifty percent gray. The hood is mounted in front of the television set 91. The hood includes a test aperture 92 one inch wide by one and one-eighth inches high in the rear wall of the hood centered vertically and two and one-fourth inches left of the center. This test aperture is for the subjective colors which are displayed on the television screen. The rear wall also includes a Munsell aperture 93 one-half inch wide by five-eighths inch high which is two and one-fourth inches to the right of center of the rear wall, and is aligned horizontally with the test aperture. This Munsell aperture is used to expose successive Munsell chips found on conventional Munsell chip pages so that any one chip may be seen through this aperture. A pocket 94 is provided behind the Munsell aperture in which may be positioned a chip or a Munsell chip page. It is this pocket which requires the four and one-half inch space between the apertures. Surrounding the Munsell aperture on the inside rear wall is a one-fourth inch wide white surround to correspond to the surround in the subjective color test configuration on the television screen. Each chip will have a white rectangle (one-fourth inch wide by three-eighths inch high) in its center.

An amber (e.g., Wratten 86) filter preferably is used in the test aperture to bring the high color temperature of the P4 phosphor of the cathode ray tube down to 2854° K. which will compensate for the lack of incandescent light or daylight such as are found in the average home viewing situation. Also, this will compensate for the lack of a surrounding steady black and white television picture. The Munsell chip and its white surround are illuminated with approximately 2854° K. (CIE Standard Source A) light source 95 at a forty-five degree angle and providing the same candle power of the reflected light as light from the television screen through the test aperture and filter. This illumination should not fall on the cathode ray tube glass, and a light baffle 96 positioned vertically at right angles to the center of the rear wall may be used. Imaging of the viewer should be avoided in the cathode ray tube glass by using eye holes 97 in a front wall of the hood.

The subjective color is presented on the television screen from tape or film as described above, and similar colored Munsell chips are used one at a time in the Munsell aperture until one chip is found which most closely matches the subjective color seen in the test aperture. The Munsell notation for this chip and the designation for the subjective color code used are noted. In performing the comparison, observers who have been tested to have normal color vision should be used, their eyes should be adapted to the viewing hood illumination conditions for ten minutes before each run, and the eyes should be rested one minute before each test. The final correlation is the average results of three observers for two runs for each observer on different days. Charts of the nature of those shown in FIG. 3A through 3D are prepared in which the chosen coded sequence and Munsell notation for each are specified, and the corresponding Munsell chips are affixed (as by an adhesive) to the chart. The charts are then organized by color characteristics of the Munsell colors so that they can be readily referred to so as to find a Munsell color similar to the physical color of a specific scene or image.

In the foregoing description, the CIE chromaticity diagram and its referencing designations (i.e., X, Y and Z coordinates), or other systems of designating color, can be used in place of the Munsell system. If a system such as the CIE system is utilized, one chromaticity diagram has all the physical colors thereon which will serve in place of the multiplicity of Munsell color chips, and the coordinates referencing the single diagram are used on the individual subjective color coding charts. Tables also are available for converting between the CIE and Munsell systems.

An alternative arrangement for utilizing animation techniques in the production of subjective color is illustrated in FIGS. 7A and 7B. In this example, a projector 94 projects a picture on a translucent screen 95. Cells 96 and 97 are similar to the cells 46 and 47 in FIG. 4, but they are transparent and are opaque in the black areas or translucent in the gray areas to mask the image from the projector and add pictorial data in the masked area. The mirror 13 reflects the composite picture to a television camera 14 in the same manner described in connection with the arrangement shown in FIG. 1. As shown in FIG. 7B, the black and white image "watch the signals" 98 of the scene 99 is provided by the image from the projector 94 falling on the translucent screen 95. The subjective color insert 100 is provided by the cells 96 and 97. The projector 94 may project a slide or film strip if only one static image is desired for an entire scene. On the other hand, the projector 94 may project a frame of a motion picture for every one or more television frames or fields such that the scene includes a complete series of film frames and when the video tape recorder 15 is played back the subjective color insert 100 is seen inserted within a motion picture.

Instead of performing original art work in preparing the cells to represent a scene or commercial product, a series of similar black and white photographs or actual product packages may be used by retouching them in blacks, grays and whites in the areas to appear in subjective color. One photograph for each of the six frames of the subjective color sequence as shown in FIG. 5 is used.

The concepts described herein in enabling the production of subjective color may be used in accordance with the teachings of said above application entitled "Combining Physical Color and Subjective Color," and used with color television or color movie equipment. In this manner, physical color and subjective color may be combined thereby producing, for example, super saturated colors on the screen of a color television receiver or for color movies or the like.

It will be apparent from the foregoing, that the present invention provides several methods and arrangements whereby the quality of subjective color may be greatly enhanced when transmitted over a black and white television system. The concepts of the invention also are applicable to motion pictures, radar and other pictorial communication systems, and for computer read-outs. Thus, the present embodiments of this invention are to be considered in all respects as illustrative and not restrictive, the scope of the invention being indicated by the appended claims rather than by the foregoing description, and all changes which come within the meaning and range of equivalency of the claims therefore are intended to be embraced therein.

What is claimed is:

1. An animation method of slowly organizing frames of information for production of subjective color comprising the steps of:

reading from a subjective color coding chart a sequence of light and dark indicies and a rate of sequence repetition to provide upon playback the production of subjective color, programming said sequence of indicies, and storing a plurality of said sequences for subsequent fast playback to provide a sustained display in subjective color.

2. The method of claim 1 wherein said frames of information are television fields.

3. The method of claim 1 wherein said frames of information are television frames.

4. The method of claim 1 wherein said frames of information are motion picture frames.

5. The method of claim 1 wherein said frames of information are computer information frames.

6. The method of claim 1 wherein said sequence of light and dark indicies includes:

a discharge phase during which an entire area is dark, a color coding phase during which areas to appear in subjective color are dark and other areas are light, and one or more white phases during which areas to appear in subjective color and other areas are light.

7. The method of claim 1 wherein said color coding chart indicates the physcal color which results from a particular sequence and rate of sequence repetition.

8. The method of claim 1 wherein said programming includes the preparation of animation cells upon which said sequence of light and dark indices is represented pictorially.

9. The method of claim 1 wherein said programming includes preparation of a computer program wherein said sequence of light and dark indices is represented by computer instructions.

10. The method of claim 1 wherein said storing occurs on video tape.

11. The method of claim 1 wherein storing occurs on motion picture film.

12. The method of claim 1 wherein said storing occurs in a computer memory.

13. The method of claim 1 wherein said animation production subjective color is inserted into a non-animated information frame.

14. A method of recording sequences of light and dark information which upon playback and display will appear in subjective color, comprising the steps of:

preparing animation cells in a coded sequence including a discharge phase, color coding phase and white phase, for providing a total time length of each sequence upon playback of between one-thirtieth to one-third second, said animation cells being prepared for said respective three phases with said discharge phase being dark in the entire area in which the subjective color is to be reproduced, said color coding phase being dark in the area to appear in subjective color and light in other areas, and said white phase being light in the area to appear in subjective color and in other areas, and recording said cells in a step by step fashion in accordance with said sequence to store indicia of said light and dark areas on a recording media, and repeating the recording of the sequence a plurality of times to provide upon playback a repeat of the sequence a number of times and a sustained display of subjective color.

15. A method as in claim 14 wherein:

an image is applied to one or more of said cells to provide a composite scene upon display of an image portion and a subjective color portion.

16. A method as in claim 14 wherein:

said sequence is for producing the subjective color red on the screen of a television receiver operating at sixty fields per second, $$S_r = D_r + B_r + A_r$$

and $$SF = 60/S_r$$

where:

(1) $D_r$ is number (integer) of TV fields in Discharge Phase $1 \leqslant D_r \leqslant 18$;
(2) $B_r$ is number (integer of TV fields in the Red Color Coding Phase $1 \leqslant B_r \leqslant 18$;
(3) $A_r$ is number (integer) of TV fields in White Phase $1 \leqslant A_r \leqslant 18$;
(4) $S_r$ is total number (integer) of TV fields in one Red Code Sequence $3 \leqslant S_r \leqslant 20$; and
(5) SF is Sequency Frequency $3 \leqslant SF \leqslant 20$.

17. A method as in claim 14 wherein:

said sequence is for producing the subjective color green on the screen of a television receiver operating at sixty fields per second, $$S_g = D_g + A_{g_1} + B_g + A_{g_2}$$

and $$SF = 60/S_g$$

where:

(1) $D_g$ is number (integer) of TV fields in Discharge Phase $1 \leqslant D_g \leqslant 17$;
(2) $B_g$ is number (integer of TV fields in the green Color Coding Phase $1 \leqslant B_g \leqslant 17$;
(3) $A_{g_1}$ is number (integer) of TV fields in First White Phase $1 \leqslant A_{g_1} \leqslant 17$;
(4) $A_{g_2}$ is number (integer) of TV fields in Second White Phase $1 \leqslant A_{g_2} \leqslant 17$;
(5) $S_g$ is total number (integer) of TV fields in one Green Code Sequence $4 \leqslant S_g \leqslant 20$; and
(6) SF is Sequence Frequency $3 \leqslant SF \leqslant 15$.

18. A method as in claim 14 wherein:

said sequence is for producing the subjective color blue on the screen of a television receiver operating at sixty fields per second, $$S_b = D_b + A_b + B_b$$

and $$SF = 60/S_b$$

where:

(1) $D_b$ is number (integer) of TV fields in Discharge Phase $1 \leqslant D_b \leqslant 18$;

(2) $B_b$ is number (integer) of TV fields in the blue Color Coding Phase $1 \leqslant B_b \leqslant 18$;

(3) $A_b$ is number (integer) of TV fields in White Phase $1 \leqslant A_b \leqslant 18$;

(4) $S_b$ is total number (integer) of TV fields in one Blue Code Sequence $3 \leqslant S_b \leqslant 20$; and (5) SF is Sequence Frequency $3 \leqslant SF \leqslant 20$.

19. A method of correlation between physical color and subjective color comprising:

preparing animation cells according to a subjective color code sequence which upon presentation on a viewing screen is repeated between approximately three and twenty times per second, including preparing a first animation cell having a dark area to provide a subjective color discharge phase, preparing a second animation cell having a dark area thereon to correspond to the area to appear in subjective color on said screen and comprising the subjective color coding phase, and preparing a third animation cell having a white area comprising a subjective color white phase, recording in a step by step manner said cells in accordance with said subjective color code sequence a plurality of times, presenting said recording on a screen to produce a subjective color thereon while substantially preventing extraneous light from impinging upon said screen, and successively positioning a range of physical colors near the area of subjective color on said screen, comparing the subjective color with the physical color, and noting the physical color which most closely matches the subjective color along with the subjective color code therefor.

20. An animation apparatus for inserting subjective color into a recorded scene comprising:

projection means for focusing the recorded scene on a screen, animation means at said screen, said animation means including animated cells having a series of light and dark indicies for providing subjective color when replayed at a predetermned rate, said animation cells being combined and positioned to produce in an area of the recorded scene a sequence of light and dark indicies for producing subjective color by blocking substantially all light from said area and blocking and passing light from the portion of said area to be subjectively colored, means for inserting images from said animation means into images projected by said projection means on said screen to form a composite image, camera means for picking up said composite image, and recording means for storing the composite image picked up oy said camera.

References Cited

UNITED STATES PATENTS 2,844,990 7/1958 Nagler et al. ----- 178—5.2 XR

RICHARD MURRAY, Primary Examiner

R. L. RICHARDSON, Assistant Examiner

U.S. Cl. X.R.

178—6.6